United States Patent [19]

Stubblefield

[11] Patent Number: 5,052,814
[45] Date of Patent: Oct. 1, 1991

[54] SHALLOW MARINE SEISMIC SYSTEM AND METHOD

[75] Inventor: Steven A. Stubblefield, Houston, Tex.

[73] Assignee: Texaco Inc., White Plains, N.Y.

[21] Appl. No.: 584,685

[22] Filed: Sep. 19, 1990

[51] Int. Cl.⁵ .............................................. G01V 1/38
[52] U.S. Cl. ....................................... 367/15; 367/16
[58] Field of Search .................... 367/2, 15, 16, 21, 77, 367/130, 128, 3, 4; 181/110; 441/11, 21

[56] References Cited

U.S. PATENT DOCUMENTS

| | | | |
|---|---|---|---|
| 2,324,378 | 7/1943 | Flude | 367/15 |
| 3,299,398 | 1/1967 | Hersey et al. | 367/3 |
| 3,710,259 | 1/1973 | Kirby et al. | 367/15 |
| 4,463,451 | 7/1984 | Warmack et al. | 367/16 |
| 4,516,227 | 5/1985 | Wener et al. | 367/15 |

Primary Examiner—Ian J. Lobo
Attorney, Agent, or Firm—Robert A. Kulason; James J. O'Loughlin; Ronald G. Gillespie

[57] ABSTRACT

The present invention includes a buoy floating on a body of water. Positioning devices attached to the buoy are responsive to control signals to control the position of the buoy. A hydrone is suspended from the buoy to a predetermined shallow depth with an electrical cable and converts seismic waves to an electrical signal. A navigational device, on the buoy, provides position signals corresponding to the position of the buoy. A first transceiver with an antenna, receives first transmitted signals from a ship and provides them as control signals to the positioning devices. The first transceiver transmits signals corresponding to the seismic signal and to the position signals. A seismic device, located in the body of water, creates event in the body of water in response to a fire signal. Fire control apparatus located on the ship provides the fire signal to the seismic device. The ship also has on board a second transceiver, with an antenna, which provides the first transmitted signals and receives the second transmitted signals to provide second received signals. Data processing apparatus processes at least one signal of the second receiver signals and the fire signal to provide a seismic record. Navigational equipment provides control signals to the second transceiver for transmission as the first transmitted signals in accordance with the second received signals corresponding to the position signals.

9 Claims, 1 Drawing Sheet 5,052,814

SHALLOW MARINE SEISMIC SYSTEM AND METHOD

BACKGROUND OF THE INVENTION

1. Field of the Invention

The present invention relates to seismic systems and methods in general and, more particularly, marine seismic systems and methods.

SUMMARY OF THE INVENTION

The present invention includes a buoy floating on a body of water. Positioning devices attached to the buoy are responsive to control signals to control the position of the buoy. A hydrone is suspended from the buoy to a predetermined shallow depth with an electrical cable and converts seismic waves to an electrical signal. A navigational device, on the buoy, provides position signals corresponding to the position of the buoy. A first transceiver with an antenna, receives first transmitted signals from a ship and provides them as control signals to the positioning devices. The first transceiver transmits signals corresponding to the electrical signal and to the position signals.

A seismic device, located in the body of water, creates event in the body of water in response to a fire signal. Fire control apparatus located on the ship provides the fire signal to the seismic device.

The ship also has on board a second transceiver, with an antenna, which provides the first transmitted signals and receives the second transmitted signals to provide second received signals. Data processing apparatus processes at least one signal of the second receiver signals and the fire signal to provide a seismic record. Navigational equipment provides control signals to the second transceiver for transmission as the first transmitted signals in accordance with the second received signals corresponding to the position signals.

The objects and advantages of the invention will appear more fully hereinafter, from a consideration of the detailed description which follows, taken together with the accompanying drawing where one embodiment is illustrated by the way of example. It is to be expressly understood, however, that the drawing is for illustrative purposes only, and it is not to be construed as defining the limits of the invention.

DESCRIPTION OF THE INVENTION

Figure 1:
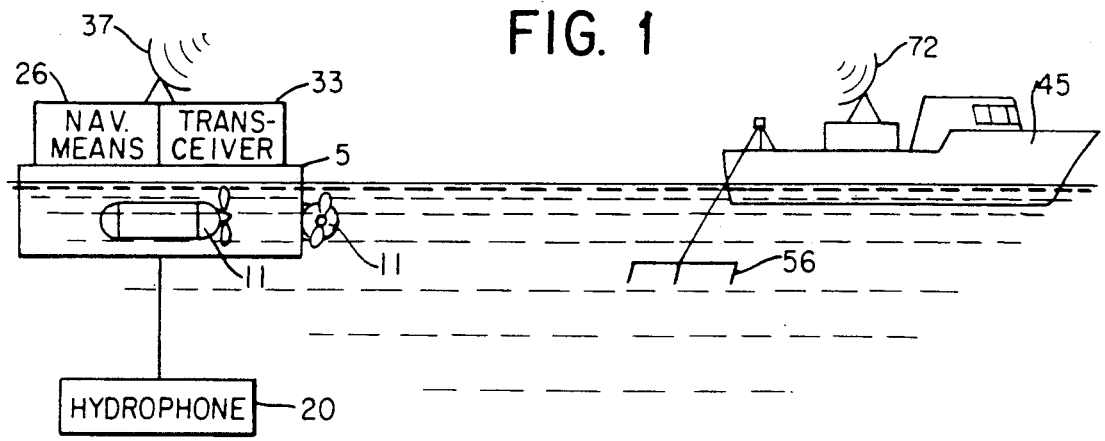
FIG. 1 is a graphical representation of marine seismic system constructed in accordance with the present invention.
Figure 2:
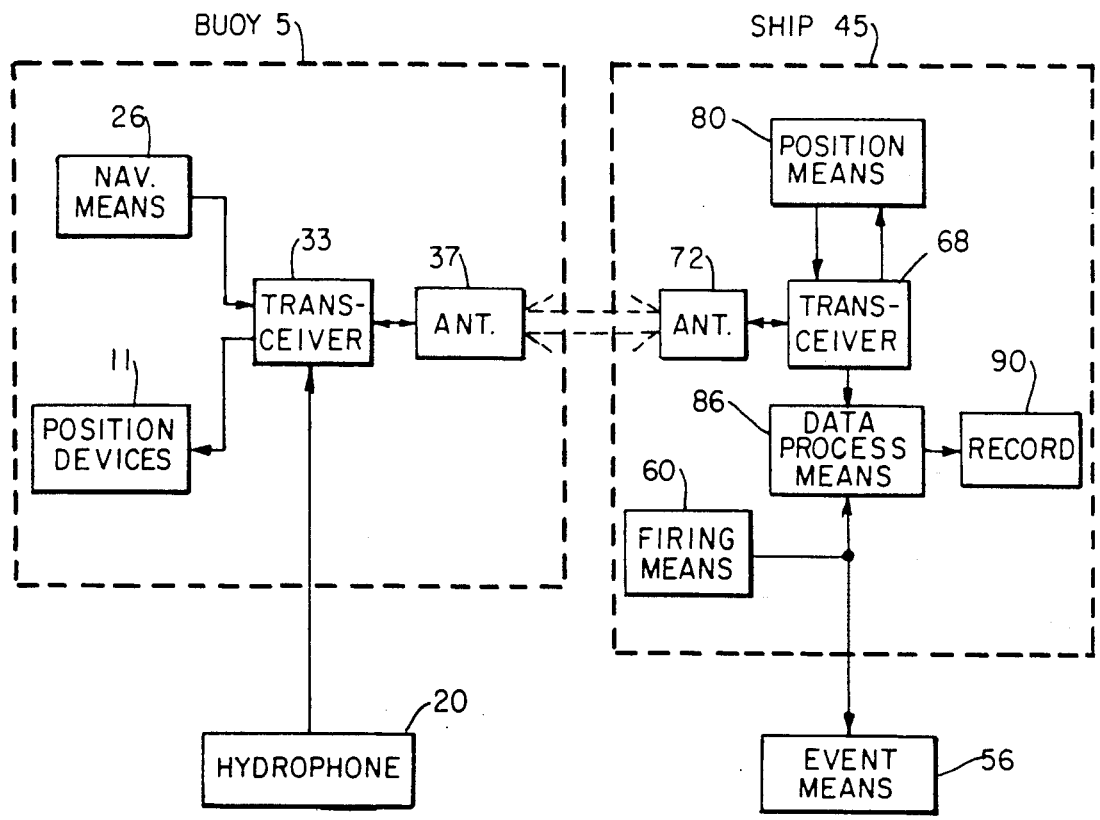
FIG. 2 is a simplified block diagram of the system shown in FIG. 1.

Referring now to FIGS. 1 and 2, a buoy 5, or any other floatation device, floats on top of a body of water. Position devices 11 are located on the sides of the buoy 5 for positioning buoy 5 as hereinafter explained. Position devices 11 may be electric motors, rotating propellers or any other device capable of moving buoy 5 in a controlled direction.

Suspended from buoy 5, by an electrical cable 14, is a hydrophone 20. Hydrophone 20 may be a single hydrophone or a cluster of hydrophones representative of a single point. The length of cable 14 determines the depth of hydrophone 20. The present invention envisions a shallow depth of substantially 400 feet or less.

Located on buoy 5 is a conventional type navigational device 26 which provides signals corresponding to the position of buoy 5. Also, on buoy 5 is a conventional type transceiver 33, having an antenna 37, connected to electrical cable 14, positioning devices and to navigational device 26. Transceiver 33 receives first transmitted signals and transmits second transmitted signals as hereinafter explained.

Transceiver 33 processes the first transmitted signals to provide control signals to positioning devices 11 so as to control the positioning of buoy 5. Transceiver 33 also processes the signals from navigational device 26 and hydrophone 20 and transmits them as the second transmitted signals.

A ship 45 tows an array of event means 56. Event means 56 may be air guns or water guns, for example. The firing of event means 56 is a seismic event. Firing means 60 is connected to event means 56 and provides a fire signal to event means 56 causing it to create a seismic event.

A transceiver 68 on board ship 45 has an antenna 72. Antenna 72 which receives the second transmitted signals from antenna 37 and provides them to transceiver 68. Transceiver 68 processes the received signals from antenna 72 to provide the position signals to positioning means 80 and to provide the seismic signal from the hydrophone 20 to seismic data processing mean 86. Seismic data processing means 86 also receives the fire signal from firing means 60 and provides a seismic record 90.

Positioning means 80 has operator input capabilities and develops error signals in accordance with a desired position and the position signals from buoy 5. The error signals from positioning means 80 are provided to transceiver 68 which transmits them, via antenna 72, as the first transmitted signals. The error signals are then utilized on buoy 5 as the control signals to control the positioning of buoy 5.

It may be desired to have the electronics on buoy 5 in an inactive state until a seismic event occurs.

In that case, firing means 60 would send a fire signal to the electronics on buoy 5 via transceiver 68, to let the electronic equipment know it is time to "wake up" its seismic circuits to record a seismic record and transmit it to the boat.

What is claimed is:

1. A marine seismic system comprising:
   acquisition means including:
   buoy means for floating on a body of water,
   a plurality of propelling means attached to the buoy means in such a manner so as to be able to move the buoy means and responsive to control signals for moving the buoy means so as to position the buoy means on the body of water,
   hydrophone means for converting seismic waves resulting from a seismic event to at least one electrical signal,
   cable means for suspending the hydrophone means from the buoy means to a predetermined shallow depth and for carrying the electrical signal from hydrophone means,
   navigational means for providing position signals corresponding to the position of the buoy means, and
   first antenna means connected to the propelling means, to the cable means and to the navigational means for receiving first transmitted signals from a ship to provide first received signals as control signals to the propelling means, and for transmitting second transmitted signals to the ship corresponding to the electrical signal from the hydrophone means and to the position signals from the navigational means;

event means located in the body of water and connected to the ship for creating a seismic event in response to a fire signal, and equipment located on the ship includes:

firing means connected to the event means for providing the fire signal, second antenna means for receiving the second transmitted signals to provide second received signals and for transmitting the first transmitted signals, data processing means connected to the second antenna means and to the firing means for processing the fire signal and at least one signal of the second received signal corresponding to the electrical signal from the hydrophone means to provide a seismic record, and location means connected to the second antenna means for providing the control signals to the second antenna means for transmission as the first transmitted signals in accordance with desired position and the second received signals corresponding to the actual position.

2. A system as described in claim 1 in which the predetermined depth is substantially equal to or less than 400 feet.

3. A system as described in claim 2 in which each propelling means includes a motor responsive to a control signal and a propeller rotated by the motor.

4. A system as described in claim 3 in which the location means includes:

means for entering the initial position of the buoy means into the location means, and deriving means for deriving the control signals as the difference between the initial position and the present position of the buoy means as indicated by the position signals.

5. A system as described in claim 4 in the location means further comprising:

means for an operator to enter a new position into the location means so that the deriving means derives the control signals as the difference between the new position and the position of the buoy means as indicated by the position signals so as to cause the buoy means to move to the new position.

6. A marine seismic method comprising:

floating buoy means on a body of water, controlling the position of the buoy means on the body of water with propelling means attached to the buoy means and responsive to control signals, converting seismic waves resulting from a seismic event to at least one electrical signal with hydrophone means, suspending the hydrophone means from the buoy means to a predetermined shallow depth with cable means, carrying the electrical signal from hydrophone means on the cable means, using navigational means on the buoy means to provide position signals corresponding to the position of the buoy means, and receiving first transmitted signals with first antenna means from a ship to provide first received signals as control signals to the propelling means, transmitting second transmitted signals to the ship with the first antenna means, corresponding to the electrical signal from the hydrophone means and to the position signals from the navigational means;

creating a seismic event with event means located in the body of water and connected to the ship in response to a fire signal, and providing the fire signal with firing means connected to the event means, receiving the second transmitted signals with second antenna means to provide second received signals, transmitting the first transmitted signals with the second antenna means, processing the fire signal and at least one signal of the second received signal corresponding to the electrical signal from the hydrophone means with data processing means to provide a seismic record, and providing the control signals to the second antenna means for transmission as the first transmitted signals in accordance with desired position and the second received signals corresponding to the position signals.

7. A method as described in claim 6 in which the suspending step includes suspending the hydrophone to a depth substantially equal to or less than 400 feet.

8. A method as described in claim 7 in which the step providing the control signals includes:

deriving the control signals as the difference between an initial position and the present position of the buoy means as indicated by the position signals with deriving means.

9. A method as described in claim 8 further comprising:

entering a new position into the deriving means so that the deriving means derives the control signals as the difference between the new position and the position of the buoy means as indicated by the position signals so as to cause the buoy means to move to the new position.

* * * * *